US010572809B1

(12) United States Patent
Schurmann (10) Patent No.: US 10,572,809 B1
(45) Date of Patent: Feb. 25, 2020

(54) MULTI-INT MARITIME THREAT DETECTION

(71) Applicant: Northrop Grumman Systems Corporation, Falls Church, VA (US)

(72) Inventor: Stuart R. Schurmann, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 529 days.

(21) Appl. No.: 15/254,560

(22) Filed: Sep. 1, 2016

(51) Int. Cl.
| | |
|---|---|
| *G06N 5/04* | (2006.01) |
| *G01S 13/66* | (2006.01) |
| *B63J 99/00* | (2009.01) |
| *B63B 79/00* | (2020.01) |

(52) U.S. Cl.
CPC .............. *G06N 5/047* (2013.01); *G01S 13/66* (2013.01); *B63B 79/00* (2020.01)

(58) Field of Classification Search
CPC ..... G06N 5/047; G01S 13/66; B63J 2099/008
USPC .......................................................... 706/48
See application file for complete search history.

(56) References Cited

U.S. PATENT DOCUMENTS

| | | | |
|---|---|---|---|
| 9,569,959 B1* | 2/2017 | Sprague ............... | G08G 1/0104 |
| 2013/0259300 A1* | 10/2013 | Rosswog ............... | G06N 5/04 |
| | | | 382/103 |

* cited by examiner

*Primary Examiner* — Shahriar Behnamian
(74) *Attorney, Agent, or Firm* — Katten Muchin Rosenman LLP (57) ABSTRACT

A system for detecting threats using an overt threat detector, the system includes a computer-readable memory configured to store computer executable instructions; a processor configured to execute the computer executable instructions, the computer executable instructions comprising receiving historical data regarding vessel patterns in a geographic area; generating, using a computer processor, at least one overt threat model based on the received historical data; receiving tracking data of vessels currently in the geographic area; analyzing, using the computer processor, the tracking data of vessels using the at least one overt threat model; and modifying, using the computer processor, the tracking data of vessels based on the results of the analyzing step; and an output device configured to output the modified tracking data of vessels is disclosed.

36 Claims, 9 Drawing Sheets

MULTI-INT MARITIME THREAT DETECTION

TECHNICAL FIELD

This disclosure is generally related to detecting threats posed by adversaries. In particular, this disclosure is directed to detecting swarming attacks posed by maritime adversaries.

BACKGROUND

In naval operations, such as military operations conducted by the United States Navy and commercial operations conducted by a variety of companies, there is frequently a threat of attack. For example, terrorists and pirates may engage in asymmetric warfare. Asymmetric warfare may include attempts to overwhelm a target ship or battle group with a greater number of attack vessels; there may be one target ship that is swarmed by a greater number, such as ten, attack vessels. The attack vessels are each independent targets for the target ship to neutralize. Because there may be many attack vessels, it may be difficult for the target ship to neutralize all of the attack vessels before the attack vessels inflict damage. Therefore, a system to detect such attacks earlier may result in saved lives. However, no automated system exists to detect and warn the target ship that such an attack may be underway. Currently, one or more human operators, generally radar operators, examine radar screens to determine which of the detected vessels may be engaged in an attack.

Accordingly, there is a need for an automated system to detect asymmetric maritime attacks in advance of the attacks actually occurring.

SUMMARY

In one aspect of this disclosure, a method for detecting threats using an overt threat detector, the method comprising receiving historical data regarding vessel patterns in a geographic area; generating, using a computer processor, at least one overt threat model based on the received historical data; receiving tracking data of vessels currently in the geographic area; analyzing, using the computer processor, the tracking data of vessels using the at least one overt threat model; modifying, using the computer processor, the tracking data of vessels based on the results of the analyzing step; and outputting, using the computer processor, the modified tracking data of vessels. is disclosed.

In another aspect of this disclosure, a method for detecting threats using a pattern of activity, the method comprising receiving historical data regarding vessel patterns in a geographic area; generating, using a computer processor, at least one pattern of activity distribution based on the received historical data; receiving tracking data of vessels currently in the geographic area; analyzing, using the computer processor, the tracking data of vessels using the at least one pattern of activity distribution; modifying, using the computer processor, the tracking data of vessels based on results of the analyzing step; and outputting, using the computer processor, the modified tracking data of vessels is disclosed.

In another aspect of this disclosure, a method for detecting threats using signal intelligence ("sig-int"), the method comprising receiving tracking data of vessels currently in a geographic area; receiving sig-int data originating in the geographic area; generating, using a computer processor, an error ellipse based on the sig-int data; analyzing, using the computer processor, the tracking data using the error ellipse; modifying, using the computer processor, the tracking data based on the results of the analyzing step; and outputting, using the computer processor, the modified tracking data of vessels is disclosed.

In another aspect of this disclosure, a system for detecting threats using an overt threat detector, the system comprising a computer-readable memory configured to store computer executable instructions; a processor configured to execute the computer executable instructions, the computer executable instructions comprising receiving historical data regarding vessel patterns in a geographic area; generating, using a computer processor, at least one overt threat model based on the received historical data; receiving tracking data of vessels currently in the geographic area; analyzing, using the computer processor, the tracking data of vessels using the at least one overt threat model; and modifying, using the computer processor, the tracking data of vessels based on the results of the analyzing step; and an output device configured to output the modified tracking data of vessels is disclosed.

In another aspect of this disclosure, a system for detecting threats using a pattern of activity, the system comprising a computer-readable memory configured to store computer executable instructions; a processor configured to execute the computer executable instructions, the computer executable instructions comprising receiving historical data regarding vessel patterns in a geographic area; generating, using a computer processor, at least one pattern of activity distribution based on the received historical data; receiving tracking data of vessels currently in the geographic area; analyzing, using the computer processor, the tracking data of vessels using the at least one pattern of activity distribution; and modifying, using the computer processor, the tracking data of vessels based on results of the analyzing step; and an output device configured to output the modified tracking data of vessels is disclosed.

In another aspect of this disclosure, a system for detecting threats using a pattern of activity, the system comprising a computer-readable memory configured to store computer executable instructions; a processor configured to execute the computer executable instructions, the computer executable instructions comprising receiving historical data regarding vessel patterns in a geographic area; generating, using a computer processor, at least one pattern of activity distribution based on the received historical data; receiving tracking data of vessels currently in the geographic area; analyzing, using the computer processor, the tracking data of vessels using the at least one pattern of activity distribution; and modifying, using the computer processor, the tracking data of vessels based on results of the analyzing step; and an output device configured to output the modified tracking data of vessels is disclosed.

DETAILED DESCRIPTION

It is to be understood that the figures and descriptions of the present disclosure may have been simplified to illustrate elements that are relevant for a clear understanding of the present disclosure, while eliminating, for purposes of clarity, other elements found in a typical networking system or method. Those of ordinary skill in the art will recognize that other elements may be desirable and/or required in order to implement the present disclosure. However, because such elements are well known in the art, and because they do not facilitate a better understanding of the present disclosure, a discussion of such elements is not provided herein. It is also to be understood that the figures included herewith only provide diagrammatic representations of the presently preferred structures of the present disclosure and that structures falling within the scope of the present disclosure may include structures different than those shown in the drawings.

Broadly, this disclosure discloses systems and methods for detecting maritime threats. In one aspect of this disclosure, three channels may be used to detect maritime threats: an overt threat behavior channel, a pattern of activity channel, and a signal intelligence channel. One of ordinary skill in the art would readily recognize that the systems and methods disclosed herein may use any combination of the channels to detect maritime threats, including using only one channel. In one aspect of this disclosure, the overt threat behavior channel may generate models that model potentially threatening behavior. The systems and methods may then analyze the current positioning and movement of vessels within a geographic area using the models to determine whether any of the vessels pose a threat. In another aspect of this disclosure, the pattern of activity channel may generate models that model historical vessel behavior. The systems and methods may then analyze the current behavior of vessels within the geographic area using the models to determine whether any of the vessels pose a threat. In another aspect of this disclosure, the signal intelligence channel may gather signals from vessels in a geographic area. The signal intelligence channel may then generate an error ellipse denoting an area within the geographic area that the signal is most likely to originate. The systems and methods may then increase a threat level of any vessels located within the error ellipse.

Figure 1:
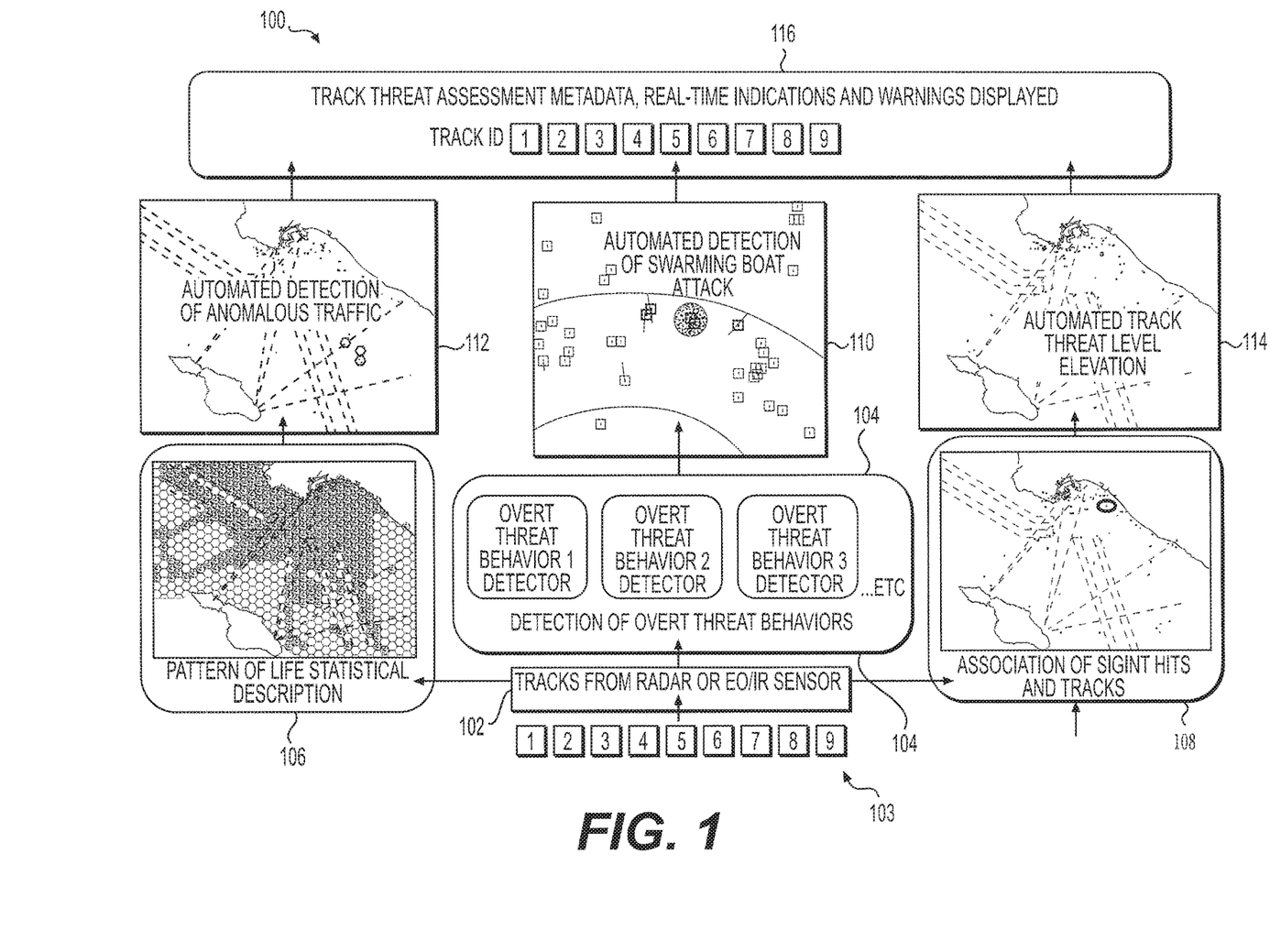
FIG. 1 shows three channels of a multi-int maritime threat detection system, according to one aspect of this disclosure.

FIG. 1 shows three channels of a multi-int maritime threat detection system 100, according to one aspect of this disclosure. The multi-int maritime threat detection system 100 may include an overt threat behavior channel 104, a pattern of activity channel 106, and a signal intelligence ("sig-int") channel 108. One of ordinary skill in the art would readily recognize that any number of channels may be used in the multi-int maritime threat detection system 100. Each of the three channels 104, 106, 108 may receive as an input tracks 102 of other maritime vessels. The tracks 102 may be detected using any suitable detection mechanism, such as radar, lidar, video cameras, electro-optical sensors ("EO"), infrared ("IR") sensors, and communication interception equipment. The multi-int maritime threat detection system 100 may detect any number of tracks 102. For example, in FIG. 1, the multi-int maritime threat detection system 100 has detected nine tracks. The three channels 104, 106, 108 may process the tracks 102 and output a graphic. The graphic may vary depending on the channel producing the graphic. For example, the overt threat behavior channel 104 may output graphic 110, the pattern of activity channel 106 may output graphic 112, and the sig-int channel may output graphic 114. Based on these graphics, the multi-int maritime threat detection system 100 may output a result 116. For example, the result may include a track threat assessment, real-time indications, and audio and/or visual warnings for each analyzed track 102. The multi-int maritime threat detection system 100 may use any number of channels to output a result 116. For example, in some aspects of this disclosure, the multi-int maritime threat detection system 100 may use only the overt threat behavior channel 104. In other aspects, the multi-int maritime threat detection system 100 may use all three channels 104, 106, 108 to output the result 116. The overt threat behavior channel 104, the pattern of activity channel 106, and the sig-int channel 108 are described in further detail below.

Figure 2:
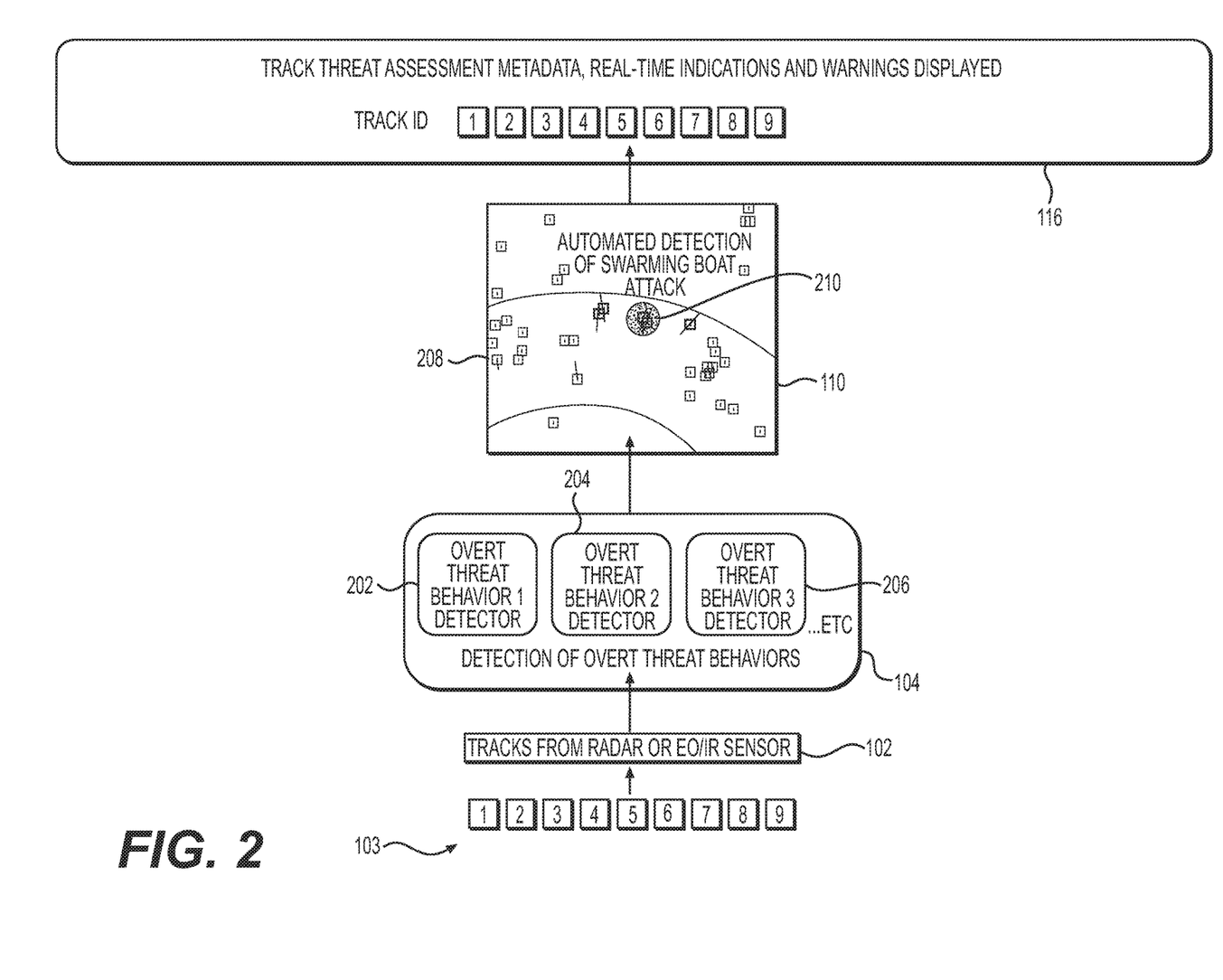
FIG. 2 shows the overt threat behavior channel, according to one aspect of this disclosure.

FIG. 2 shows the overt threat behavior channel 104, according to one aspect of this disclosure. In one aspect, nine tracks 103 are detected. The nine tracks 103 may represent a boat, a ship, a buoy, or any other maritime vessel. The nine tracks 103 may be detected using any suitable equipment, as described above in reference to FIG. 1. The nine tracks 103 may then be input into the overt threat behavior channel 104 for analysis to determine if any of the nine tracks 103 present a threat. In one aspect of this disclosure, the overt threat behavior channel 104 may utilize various models of expected behaviors. In FIG. 2, three models of expected behaviors 202, 204, 206 are shown. One of ordinary skill in the art would readily recognize that any number of models of expected behaviors may be used in the overt threat behavior channel 104. The various models of expected behaviors may model threatening behavior.

The models of expected behaviors may be based on, for example, known formations or maneuvers of maritime vessels or any other information useful for predicting maritime threats. For example, model of expected behavior 202 may model various maritime vessels forming a swarm. Model of expected behavior 204 may model a maritime formation other than a swarm. Model of expected behavior 206 may model synchronized maritime vessels, such as the maritime vessels turning together or heading towards a protected asset. Alternatively, or additionally, a mathematical formula may be generated to model threatening behavior. The mathematical formula may be generated so that it is more flexible or robust. For example, a formation of maritime vessels may represent an elevated threat. However, if the mathematical formula is not flexible, one maritime vessel dropping out of the formation may result in the multi-int maritime threat detection system 100 failing to recognize an elevated threat because one of the maritime vessels dropped out of the formation. Therefore, the multi-int maritime threat detection system 100 may be more robust if mathematical formulas underlying the models are more flexible. One of ordinary skill in the art would readily recognize that any other suitable models for modelling threatening behavior may be used. Whichever method is used to generate the models 202, 204, 206, the models 202, 204, 206 may be tested against innocent maritime traffic to ensure that false alarm rates are acceptable. The innocent maritime traffic may be provided by maritime traffic monitors. For example, in the Los Angeles harbor, MAREX is a group that monitors marine traffic in the Los Angeles harbor using, for example, radars. If the false alarm rates for a given model are sufficiently low, the given model may be used in the overt threat behavior channel 104.

The three models 202, 204, 206 may provide a baseline for threatening behavior. The overt threat behavior channel 104 may compare the tracks 102 to the models 202, 204, 206. If the overt threat behavior channel 104 determines that any of the tracks 102 correspond to threatening behavior as identified by the models 202, 204, 206, then the overt threat behavior channel 104 may output a result 116 that a risk of a threat is elevated. For example, the overt threat behavior channel 104 may determine that at least one of the tracks 102 correspond to threatening behavior as identified by the models 202, 204, 206 if there is an exact match. However, the overt threat behavior channel 104 may determine there is a correspondence even if there is not an exact match. For example, if the correspondence is represented as a percentage, then the overt threat behavior channel 104 may determine that there is a correspondence if a certain minimum percentage is reached, such as 85%. Moreover, the overt threat behavior channel 104 may graphically display which of the tracks 102 pose an elevated threat. For example, graphic 110 shows the tracks 102. In one aspect, the tracks 102 may be distinguished into two groups. A first group 208 may represent tracks that do not pose a threat. A second group 210 may represent tracks that do pose a threat. Accordingly, a user of the multi-int maritime threat detection system 100 may visually inspect which tracks are threatening and the proximity of the threatening tracks to the defended asset.

In addition to recognizing increased threats based on the models 202, 204, 206, the overt threat behavior channel 104 may determine when a maritime vessel would intersect with the defended asset. For example, the overt threat behavior channel 104 may determine that one of the tracks 102 is on a path to intersect the defended asset at a certain location and at a certain time. The overt threat behavior channel 104 may determine the location and time based on the direction the track is travelling and the speed at which it is travelling. The overt threat behavior channel may extrapolate this direction and speed data to determine when the track would intersect with the defended asset. The overt threat behavior channel 104 may provide a warning for such an occurrence.

Figure 3:
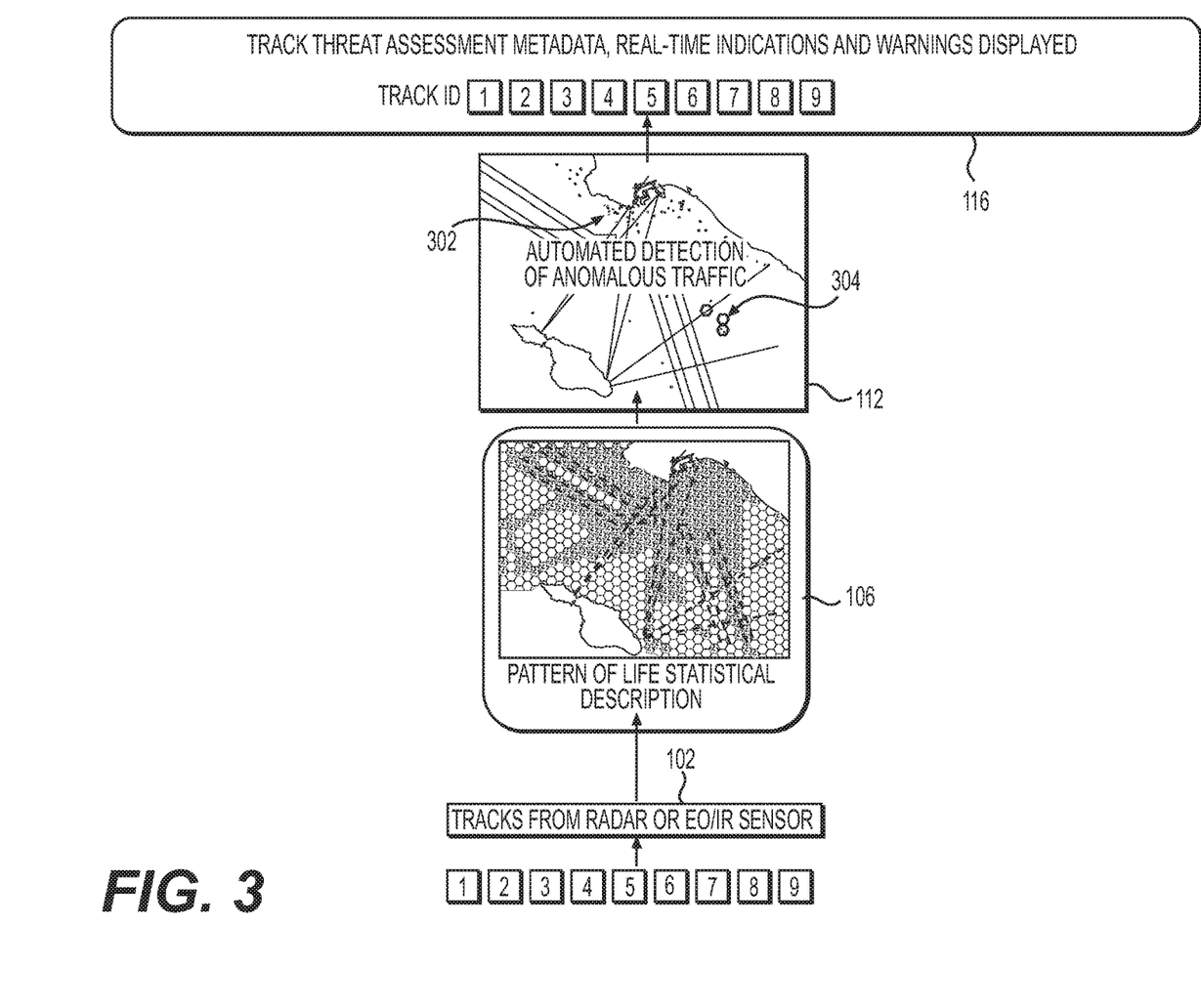
FIG. 3 shows the pattern of activity channel, according to one aspect of this disclosure.

FIG. 3 shows the pattern of activity channel 106, according to one aspect of this disclosure. The tracks 102 may be used as an input to the pattern of activity channel 106. For example, like FIG. 2, there may be nine tracks. The pattern of activity channel 106 may use the tracks 102 to generate a statistical distribution of normal traffic. For example, the pattern of activity channel 106 may generate a statistical distribution based on the location, the time of day, the day of the week, etc. For example, in the Los Angeles harbor, MAREX is a group that monitors marine traffic in the Los Angeles harbor using, for example, radars. The information gathered and provided by MAREX may serve as the tracks 102. Using the MAREX data, the pattern of activity channel 106 may generate a traffic statistical distribution. One of ordinary skill in the art would readily recognize that data gathered from any source, not just MAREX or organizations similar to MAREX, may be utilized by the pattern of activity channel 106. The pattern of activity channel 106 may then use the statistical distribution as a comparison for new vessels. For example, the multi-int maritime threat detection system 100 may compare detected traffic against the statistical distribution and output the graphic 112, which may show detected traffic that is inconsistent with the statistical distribution.

Figure 4:
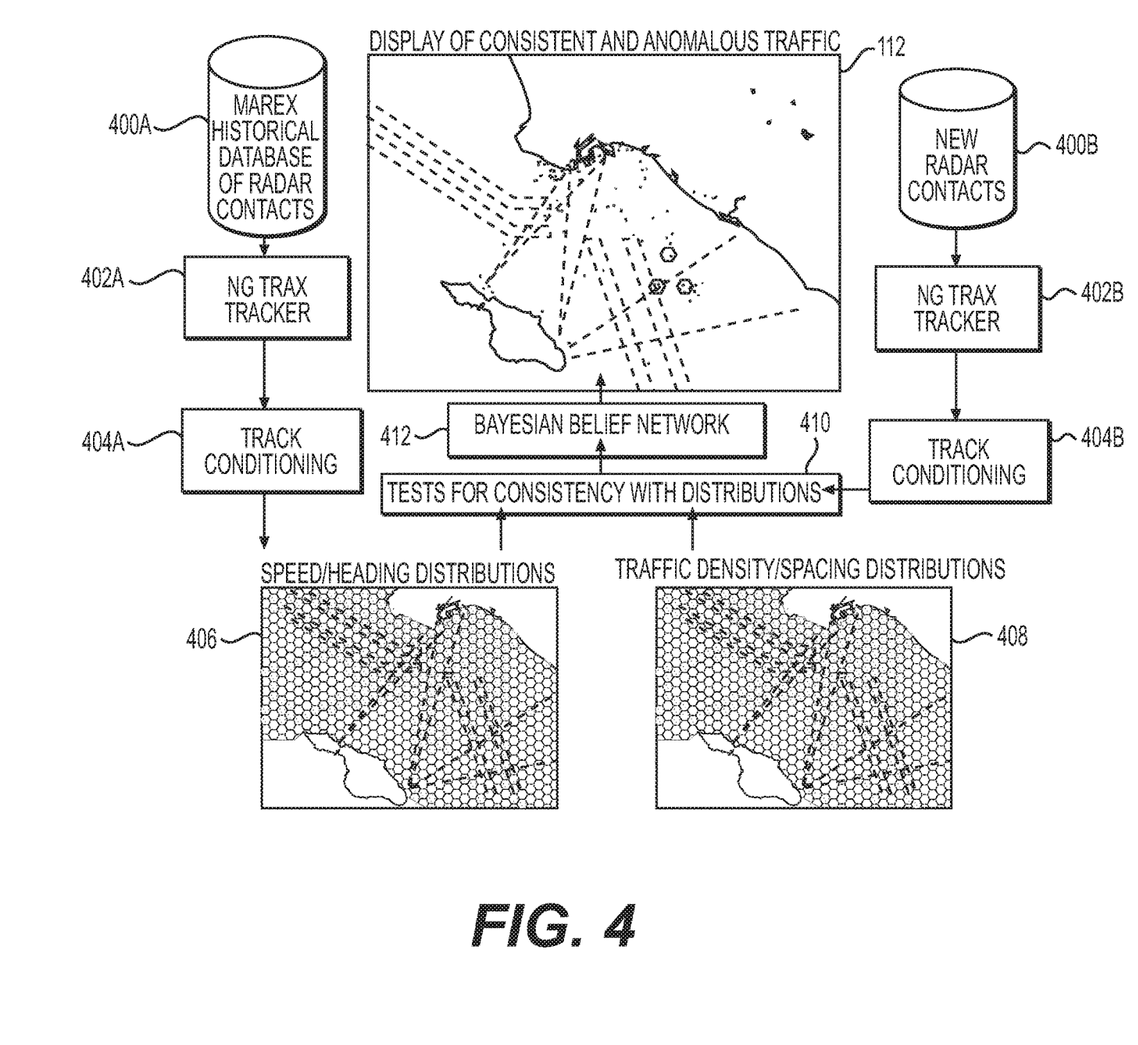
FIG. 4 shows modules to carry out the pattern of activity channel, according to one aspect of this disclosure.

FIG. 4 shows modules to carry out the pattern of activity channel 106, according to one aspect of this disclosure. The tracks 102 that may serve as inputs to the pattern of activity channel 102 may be the MAREX maritime traffic distribution 400A as described above with reference to FIG. 3. The tracks 102 may also be radar tracks associated with detected vessels 400B. The MAREX maritime traffic distribution 400A and the radar tracks associated with detected vessels 400B may be input into respective trackers 402A, 402B. The trackers 402A, 402B may output tracking data associated with the MAREX maritime traffic distribution 400A and the radar tracks associated with detected vessels 400B, which may serve as inputs to respective track conditioning modules 404A, 404B. The output of track conditioning 404A may then be used to generate the statistical distribution as described above with reference to FIG. 3. For example, FIG. 4 shows two statistical distributions. The first statistical distribution may be a combined speed and heading distribution 406. The combined speed and heading distribution 406 may indicate historical speed and heading distributions. The second statistical distribution may be a combined traffic density and spacing distribution 408. The combined traffic density and spacing distribution 408 may indicate historical traffic density and spacing distributions. One of ordinary skill in the art would readily recognize that any suitable statistical distribution may be generated based on the MAREX maritime traffic distribution 400A. Also, one of ordinary skill in the art would also readily recognize that any number and/or any combination of statistical distributions may be generated.

The pattern of activity channel 106 may then compare the output of track conditioning module 404B with the combined speed and heading distribution and the combined traffic density and spacing distribution 408 in module 410. Module 410 may test for consistency. For example, the pattern of activity channel 106 may test for how many vessels are normally in the area, based on the combined speed and heading distribution 406 or the combined traffic density and spacing distribution 408. The pattern of activity channel 106 may also test for consistency for vessel spacing or distribution. For example, the combined traffic density and spacing distribution 408 may indicate that normally there are five vessels in the area. However, if there is a greater or lesser number than five vessels in the area, for example, there are twenty vessels in the area, the pattern of activity channel 106 may indicate that there is unusual activity in the area. Another example is that if the detected vessels are closer than normal as shown in the distributions 406, 408, the pattern of activity channel 106 may indicate that there is unusual activity in the area.

Results from the consistency test module 410 may be input into a Bayesian Belief Network module 412. The Bayesian Belief Network module 412 may serve as a damper to the pattern of activity channel 106. The Bayesian Belief Network module 412 may be used to more accurately determine whether the detected tracks 400B are consistent with the statistical distributions 406, 408. For example, the Bayesian Belief Network module 412 may be used to determine whether the detected tracks 400B are more likely to be consistent with the statistical distributions 406, 408 or that they are more likely to be anomalous.

The output of the Bayesian Belief Network module 412 may then be output on a display. For example, the display may display output graphic 112. Output graphic 112 may visually indicate which vessel or vessels exhibit anomalous behavior. For example, the vessel or vessels exhibiting anomalous behavior may be shown in, for example, red while the vessel or vessels consistent with the statistical distributions 406, 408 may be shown in, for example, green. One of ordinary skill in the art would readily recognize that any color or combination of colors may be used in the output graphic 112 to indicate anomalous or consistent behavior.

Figure 5:
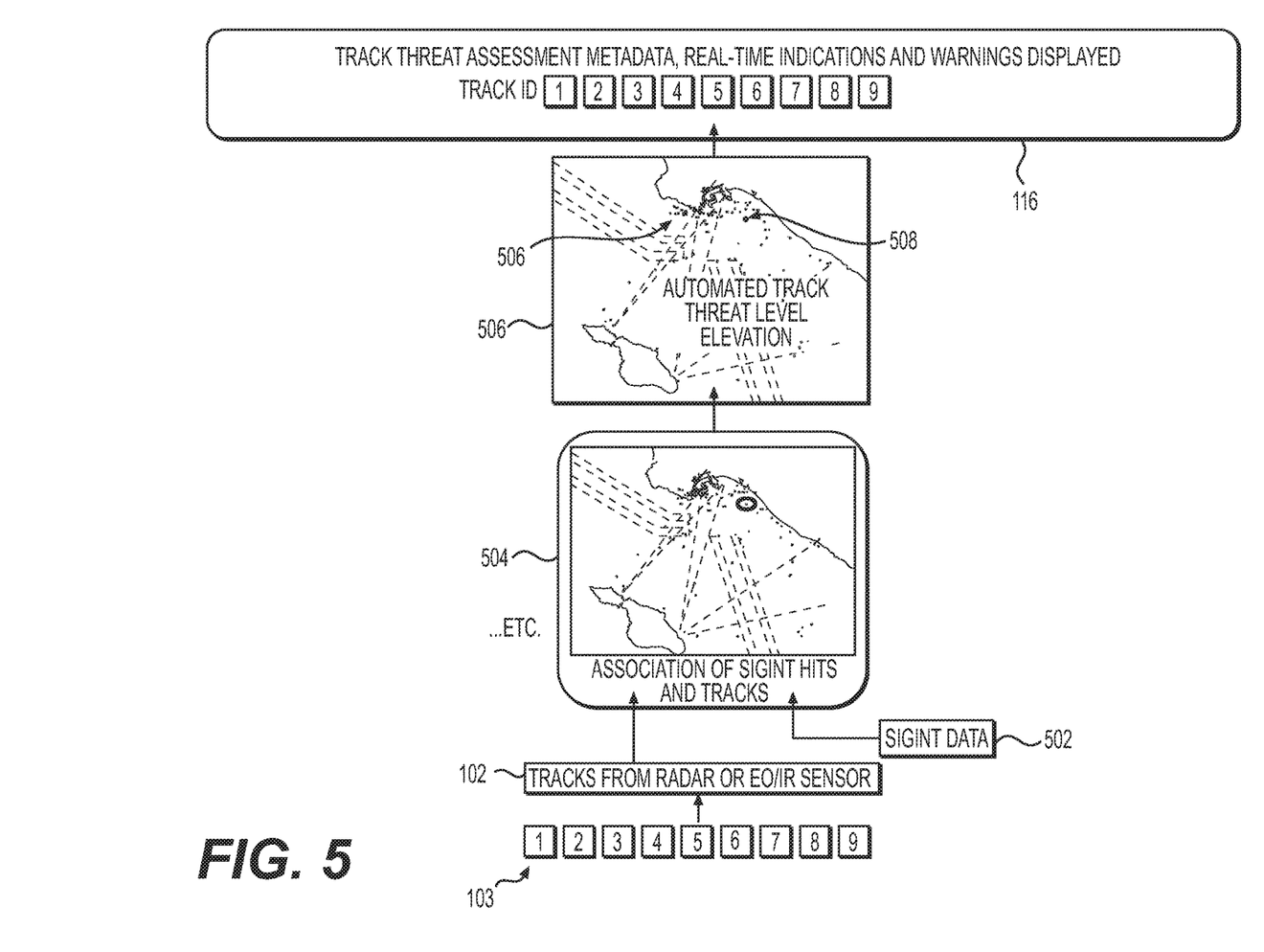
FIG. 5 shows the signals intelligence ("sig-int") channel, according to one aspect of this disclosure.

FIG. 5 shows the significant intelligence ("sig-int") channel 108, according to one aspect of this disclosure. For example, the nine tracks 103 described above may be used as inputs to the sig-int channel 108. The nine tracks 103 may be input as the tracks 102. The sig-int channel 108 may also gather sig-int data 502. Sig-int data 502 may include any suitable type and source of data. For example, the sig-int data 502 may include an intercepted cell phone message. Sig-int data 502 may also include other electronic indications such as indications that a certain vessel may be used to carry out the attack. Any suitable mechanism may be used to gather the sig-int data 502. In one aspect of this disclosure, an aircraft, such as a helicopter, may be used to collect the sig-int data 502 using any suitable mechanism. It may often be difficult to obtain a precise location of where the sig-int data 502 is originating from. If an aircraft is being used to gather the sig-int data 502, the aircraft may changes positions.

The mechanism used to collect the sig-int data 502 may then analyze how the direction of the source of the sig-int data 502 changes based on the various aircraft positions to obtain a more precise location of the sig-int data 502. Collecting sig-int data 502 from various positions may then result in an error ellipse. The error ellipse may represent an area that contains the most likely location of the sig-int data 502. A size of the error ellipse may depend on the amount of sig-int data 502 collected and a number of locations of the aircraft where the sig-int data 502 is collected.

After an error ellipse is generated, the sig-int channel 108 may indicate that vessels within the error ellipse are more likely to be dangerous. For example, in one aspect of this disclosure, detected vessels may have an associated threat score. Detected vessels located within the error ellipse may have a slightly increased threat score.

Figure 6:
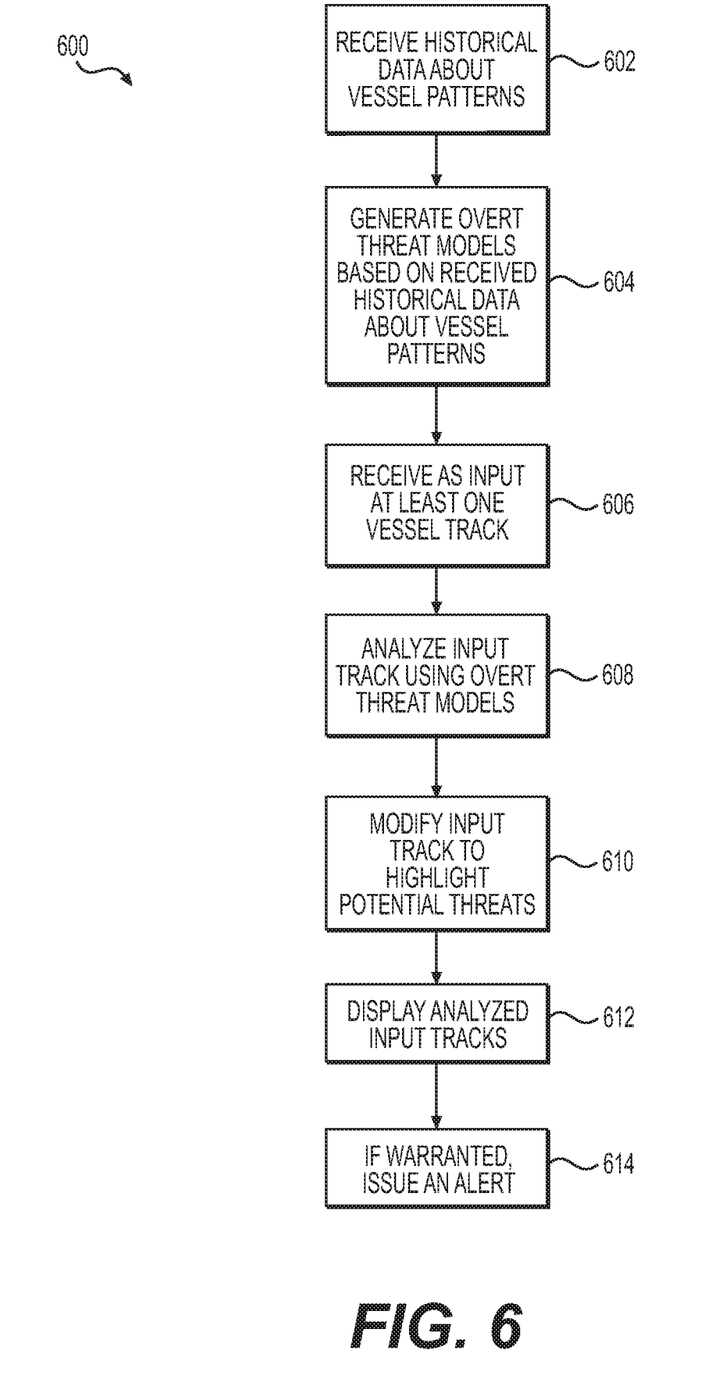
FIG. 6 is a flowchart showing a method of execution of the overt threat behavior channel, according to one aspect of this disclosure.

FIG. 6 is a flowchart showing a method 600 of execution of the overt threat behavior channel 104, according to one aspect of this disclosure. The method may begin at block 602. At block 602, the overt threat behavior channel 104 may receive as an input historical data regarding vessel patterns in a geographic area. After the overt threat behavior channel 104 receives the historical data regarding vessel patterns in a geographic area, the method 600 may proceed to block 604.

At block 604, the overt threat behavior channel 104 may generate overt threat models based on the historical data regarding vessel patterns in a geographic area. For example, the overt threat models generated in block 604 may be the three models of expected behaviors 202, 204, 206 as described above. After block 604 is completed, the method 600 may proceed to block 606.

At block 606, the overt threat behavior channel 104 may receive as an input at least one track 102 of a vessel. The at least one track 102 may be detected using any suitable hardware and software, including radar and/or images. After block 606 is complete, the method 600 may proceed to block 608.

At block 608, the overt threat behavior channel 104 may analyze the at least one input track 102 received in block 606 using the overt threat models generated in block 604. The analysis may be similar to the analysis described above with reference to FIG. 2. After block 608 is complete, the method 600 may proceed to block 610.

At block 610, the overt threat behavior channel 104 may modify the at least one input track received in block 606 based on the analysis completed in block 610. For example, if the overt threat behavior channel 104 determines that a vessel, based on the analysis completed in block 608, poses an overt threat, the overt threat behavior channel 104 may modify the track for that vessel to indicate that the vessel poses an overt threat. For example, the overt threat behavior channel 104 may change the color, shape, or size of the track of the vessel. One of ordinary skill in the art would readily recognize that other modifications may also be performed. After block 610 is complete, the method 600 may proceed to block 612.

At block 612, the overt threat behavior channel 104 may display the analyzed tracks. For example, the overt threat behavior channel 104 may output results of the analysis and modifications in block 608 and 610 in a graphical form, such as output graphic 110. As shown in FIG. 1, output graphic 110 may show a first group 208 that does not pose a threat and a second group 210 that does pose a threat. After block 612 is complete, the method 600 may proceed to block 614.

At block 614, the overt threat behavior channel 104 may issue an alert if warranted. An alert may be warranted if the overt threat behavior channel 104 determines that there is at least one potential threat, for example, in blocks 608 and 610. The alert may be, for example, graphical, such as a warning on output graphic 110, or the alert may be audible, such as an audible alarm. After block 614 is complete, the method 600 may end.

Figure 7:
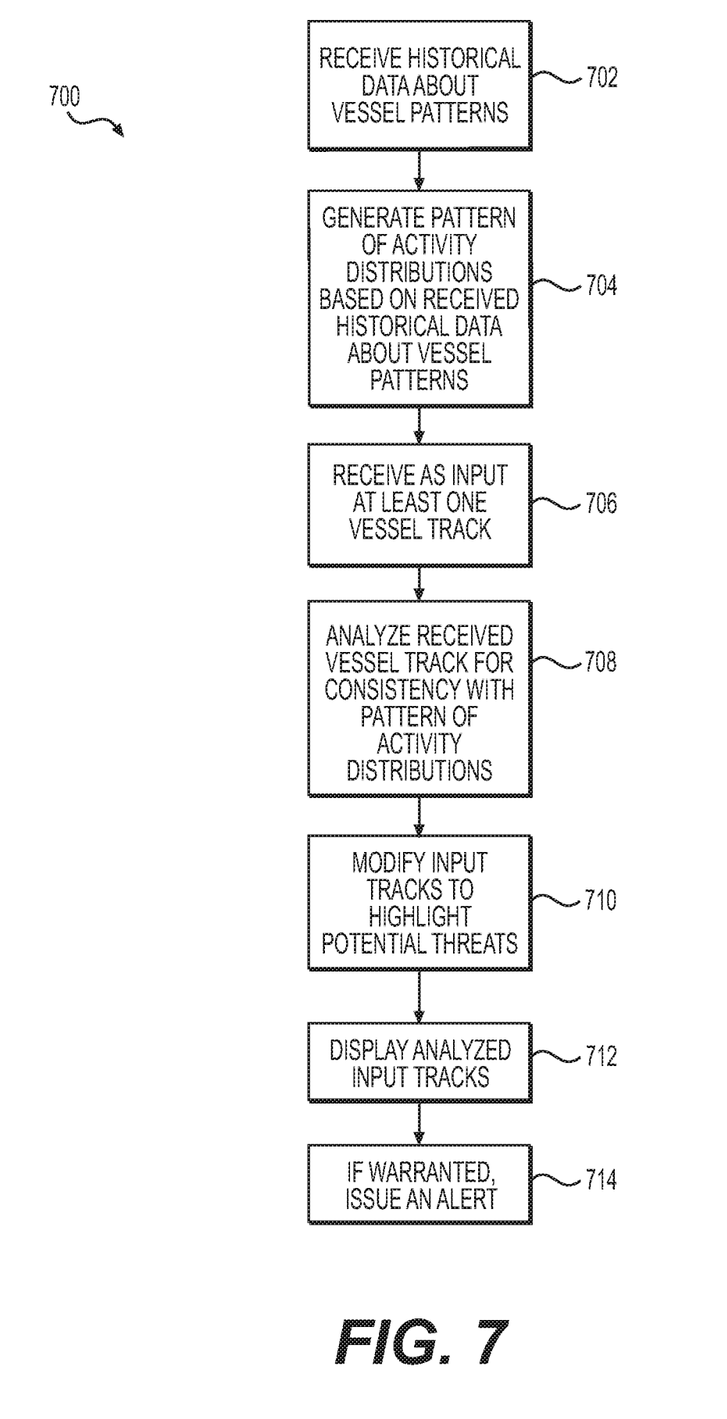
FIG. 7 is a flowchart showing a method of execution of the pattern of activity channel, according to one aspect of this disclosure.

FIG. 7 is a flowchart showing a method 700 of execution of the pattern of activity channel 106, according to one aspect of this disclosure. The method 700 may begin at block 702. At block 702, the pattern of activity channel 106 may receive as an input historical data regarding vessel patterns in a geographic area. After the pattern of activity channel 106 receives the historical data regarding vessel patterns in a geographic area, the method 700 may proceed to block 704.

At block 704, the pattern of activity channel 106 may generate at least one pattern of activity distribution based on the historical data regarding vessel patterns in a geographic area received in block 702. For example, the pattern of activity channel 106 may generate the combined speed and heading distribution 406 and the combined traffic density and spacing distribution 408 as described above. One of ordinary skill in the art would readily recognize that other pattern of activity distributions may be generated based on the historical data received in block 702. After block 704 is complete, the method 700 may proceed to block 706.

At block 706, the pattern of activity channel 106 may receive as an input at least one track 102 of a vessel. The at least one track 102 may be detected using any suitable hardware and software, including radar and/or images. After block 706 is complete, the method 700 may proceed to block 708.

At block 708, the pattern of activity channel 106 may analyze the received vessel track 102 from block 706 for consistency with the pattern of activity distributions generated in block 704, as described above. After block 708 is complete, the method 700 may proceed to block 710.

At block 710, the pattern of activity channel 106 may modify the analyzed input track to highlight potential threats, as described above with reference to FIGS. 3 and 4. After block 710 is complete, the method 700 may proceed to block 712.

At block 712, the pattern of activity channel 106 may display the analyzed tracks. For example, the pattern of activity channel 106 may output results of the analysis and modifications in blocks 708 and 710 in a graphical form, such as output graphic 112. As shown in FIG. 3, output graphic 112 may show a first group 302 that does not pose a threat and a second group 304 that does pose a threat. After block 712 is complete, the method 700 may proceed to block 714.

At block 714, the pattern of activity channel 106 may issue an alert if warranted. An alert may be warranted if the pattern of activity channel 106 determines that there is at least one potential threat, for example, in blocks 708 and 710. The alert may be, for example, graphical, such as a warning on output graphic 112, or the alert may be audible, such as an audible alarm. After block 714 is complete, the method 700 may end.

Figure 8:
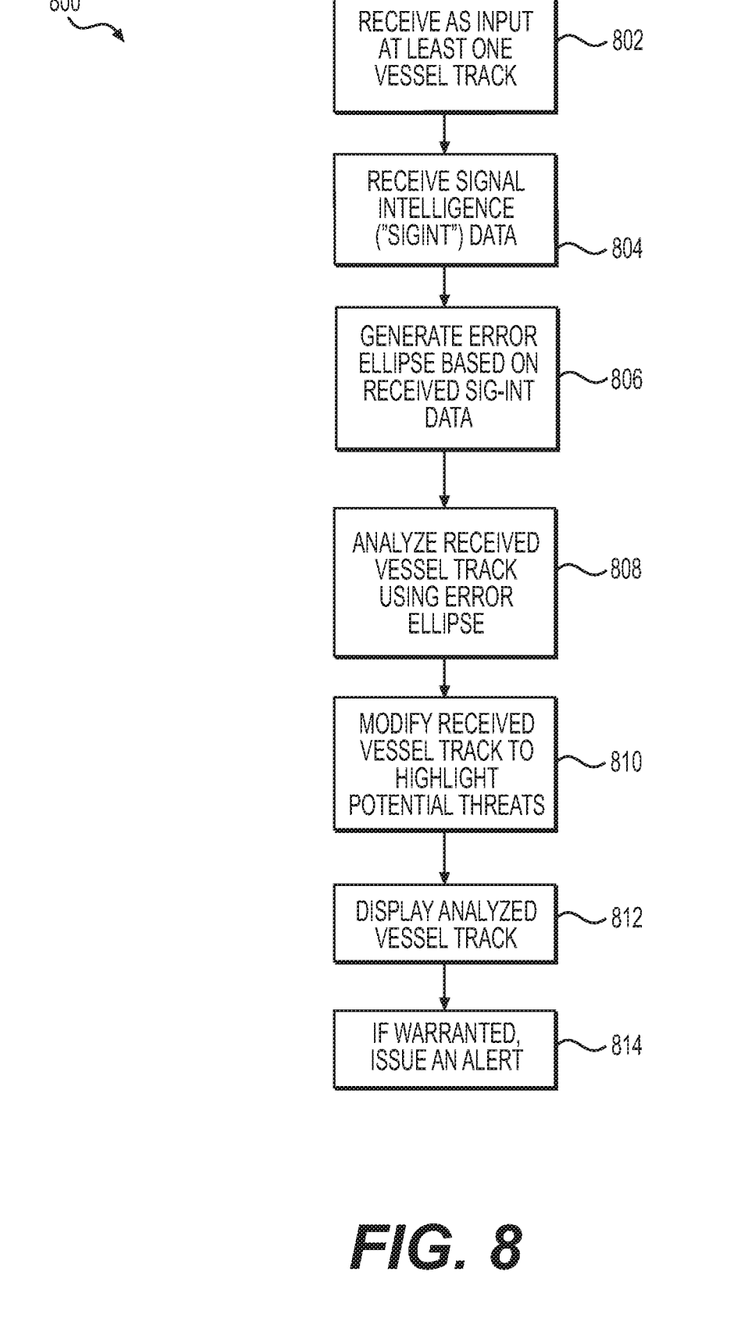
FIG. 8 is a flowchart showing a method of execution of the sig-int channel, according to one aspect of this disclosure.

FIG. 8 is a flowchart showing a method 800 of execution of the sig-int channel 108, according to one aspect of this disclosure. The method 800 may begin at block 802. At block 802, the sig-int channel 108 may receive as an input historical data regarding vessel patterns in a geographic area. After the sig-int channel 108 receives the historical data regarding vessel patterns in a geographic area, the method 800 may proceed to block 804.

At block 804, the sig-int channel 108 may receive sig-int data 502 collected as described above with reference to FIG. 5. After block 804 is complete, the method 800 may proceed to block 806.

At block 806, the sig-int channel 108 may generate an error ellipse, as described above with reference to FIG. 5, based on the sig-int data 502 received in block 804. After block 804 is complete, the method 800 may proceed to block 808.

At block 808, the sig-int channel 108 may analyze the received track in block 802 using the error ellipse generated in block 806 as described above. After block 808 is complete, the method 800 may proceed to block 810.

At block 810, the sig-int channel 108 may modify the received vessel track to highlight potential threats, as described above with reference to FIG. 5. After block 810 is complete, the method 800 may proceed to block 812.

At block 812, the sig-int channel 108 display the analyzed tracks. For example, the sig-int channel 108 may output results of the analysis and modifications in blocks 808 and 810 in a graphical form, such as output graphic 114. As shown in FIG. 5, output graphic 114 may show a first group 506 that does not pose a threat and a second group 508 that does pose a threat. After block 812 is complete, the method 800 may proceed to block 814.

At block 814, the sig-int channel 108 may issue an alert if warranted. An alert may be warranted if the sig-int channel 108 determines that there is at least one potential threat, for example, in blocks 808 and 810. The alert may be, for example, graphical, such as a warning on output graphic 114, or the alert may be audible, such as an audible alarm. After block 814 is complete, the method 800 may end.

Figure 9:
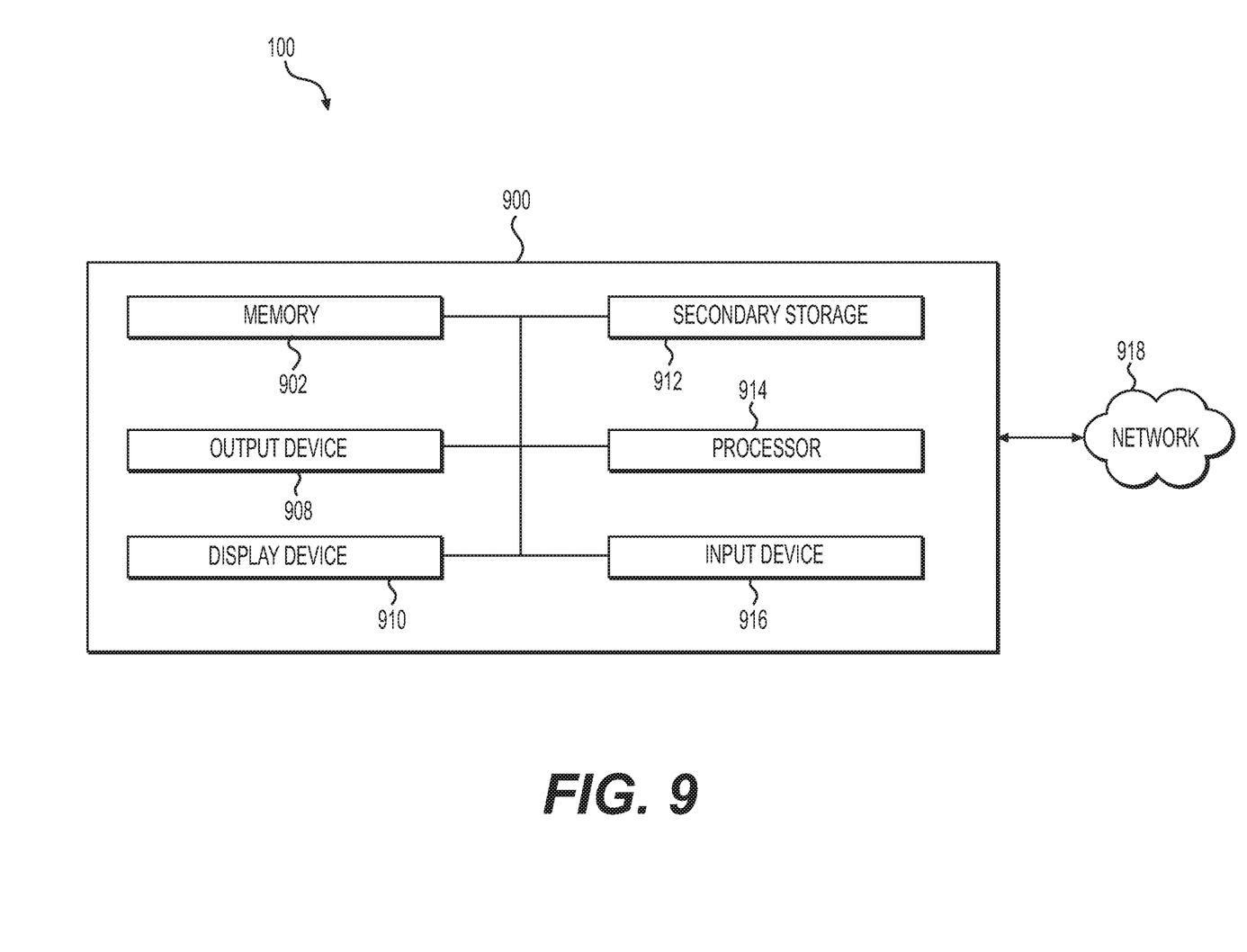
FIG. 9 is a block diagram of the multi-int maritime threat detection system, according to one aspect of this disclosure.

FIG. 9 is a block diagram 900 of the multi-int maritime threat detection system 100, according to one aspect of this disclosure. A server 900, or other computer system similarly configured, may include and execute programs to perform functions described herein, including steps of method described above. While only one processor 914 is shown in FIG. 9, it is understood that server 900, or other computing systems used to implement the renewable energy network optimization tool may include multiple processors. Additionally, a system for implementing the renewable energy network optimization tool may include multiple networked servers 900 or other computing systems. Further, a mobile device that includes some of the same components of computer system 900 may perform steps of the method described above. Computer system 900 may connect with a network 918, e.g., Internet, or other network, to receive inquires, obtain data, and transmit information (e.g., to a user work station or other user computing device) as described above.

Computer system 900 typically includes a memory 902, a secondary storage device 912, and a processor 914. Computer system 900 may also include a plurality of processors 914 and be configured as a plurality of, e.g., bladed servers, or other known server configurations. Computer system 900 may also include an input device 916, a display device 910, and an output device 908.

Memory 902 may include RAM or similar types of memory, and it may store one or more applications for execution by processor 914. Secondary storage device 912 may include a hard disk drive, floppy disk drive, CD-ROM drive, or other types of non-volatile data storage. Processor 914 may include multiple processors or include one or more multi-core processors. Any type of processor 914 capable of performing the calculations described herein may be used. Processor 914 may execute the application(s) that are stored in memory 902 or secondary storage 912, or received from the Internet or other network 918. The processing by processor 914 may be implemented in software, such as software modules, for execution by computers or other machines. These applications preferably include instructions executable to perform the functions and methods described above and illustrated in the Figures herein. The applications may provide graphic user interfaces (GUIs) through which users may view and interact with the application(s).

Also, as noted, processor 914 may execute one or more software applications in order to provide the functions described in this specification, specifically to execute and perform the steps and functions in the methods described above. Such methods and the processing may be implemented in software, such as software modules, for execution by computers or other machines.

Input device 916 may include any device for entering information into computer system 900, such as a touch-screen, keyboard, mouse, cursor-control device, microphone, digital camera, video recorder or camcorder. Input device 916 may be used to enter information into GUIs during performance of the methods described above. Display device 910 may include any type of device for presenting visual information such as, for example, a computer monitor or flat-screen display (or mobile device screen). Output device 908 may include any type of device for presenting a hard copy of information, such as a printer, and other types of output devices include speakers or any device for providing information in audio form.

Examples of computer system 900 include dedicated server computers, such as bladed servers, personal computers, laptop computers, notebook computers, palm top computers, network computers, mobile devices, or any processor-controlled device capable of executing a web browser or other type of application for interacting with the system. If computer system 900 is a server, server 900 may not include input device 916, display device 910 and output device 908.

Rather, server 900 may be connected, e.g., through a network connection to a stand-alone work station (another computer system) that has such devices.

Although only one computer system 900 is shown in detail, the system for providing a renewable energy network optimization tool may use multiple computer systems or servers as necessary or desired to support the users, as described above. Embodiments may also use back-up or redundant servers to prevent network downtime in the event of a failure of a particular server. In addition, although computer system 900 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. Computer-readable media may include instructions for controlling a computer system, such as the computer system 900, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for detecting threats using an overt threat detector, the method comprising:
   generating, using a computer processor, at least three overt threat models;
   receiving tracking data of vessels currently in a geographic area;
   analyzing, using the computer processor, the tracking data of vessels using the at least three overt threat models to determine whether the tracking data corresponds to threatening behaviors identified by the at least three overt threat models;
   elevating a risk of threat if the tracking data corresponds to the threatening behaviors of the at least three threat models;
   modifying, using the computer processor, the tracking data of vessels based on the results of the elevating a risk of threat; and
   outputting, using the computer processor, the modified tracking data of vessels.

2. The method of claim 1, wherein the tracking data of vessels currently in the geographic area is collected by radar.

3. The method of claim 1, wherein said analyzing includes comparing the tracking data with said at least three overt threat models.

4. The method of claim 1, wherein the overt threat model models various maritime vessels forming a swarm.

5. The method of claim 1, wherein the overt threat model models synchronized maritime vessels.

6. The method of claim 1, wherein the modifying step further comprises changing a portion of the tracking data from a first color to a second color.

7. The method of claim 1, wherein the outputting step further comprises displaying the modified tracking data of vessels on a display.

8. The method of claim 7, wherein the display further displays a warning about potential threats.

9. A method for detecting threats, the method comprising: receiving historical data regarding vessel patterns in a geographic area; generating, using a computer processor, at least one pattern of activity distribution based on the received historical data and at least two overt threat models, wherein the at least one pattern of activity distribution includes a distribution of normal traffic; receiving tracking data of vessels currently in the geographic area; analyzing, using the computer processor, the tracking data of vessels using the at least one pattern of activity distribution and at least two overt threat models to determine whether the tracking data corresponds to threatening behaviors identified by the at least one pattern of activity distribution and the at least two overt threat models; elevating a risk of threat if the tracking data corresponds to the threatening behaviors of the at least one pattern of activity distribution and the at least two overt threat models; modifying, using the computer processor, the tracking data of vessels based on results of the elevating a risk of threat; and outputting, using the computer processor, the modified tracking data of vessels.

10. The method of claim 9, wherein the tracking data of vessels currently in the geographic area is collected by radar.

11. The method of claim 9, wherein the modifying step further comprises changing a portion of the tracking data from a first color to a second color.

12. The method of claim 9, wherein the outputting step further comprises displaying the modified tracking data of vessels on a display.

13. The method of claim 12, wherein the display further displays a warning about potential threats.

14. The method of claim 9, wherein the analyzing step further comprises testing results using a Bayesian Belief Network.

15. The method of claim 9, wherein the at least one pattern of activity distribution is a speed distribution.

16. The method of claim 9, wherein the at least one pattern of activity distribution is a heading distribution.

17. The method of claim 9, wherein the at least one pattern of activity distribution is a traffic density distribution.

18. The method of claim 9, wherein the at least one pattern of activity distribution is a spacing distribution.

19. A system for detecting threats using an overt threat detector, the system comprising:
   a computer-readable memory configured to store computer executable instructions;
   a processor configured to execute the computer executable instructions, the computer executable instructions comprising:
      generating, using a computer processor, at least three overt threat models;
      receiving tracking data of vessels currently in the geographic area;
      analyzing, using the computer processor, the tracking data of vessels using the at least three overt threat models to determine whether the tracking data corresponds to threatening behaviors identified by the at least three overt threat models;
      elevating a risk of threat if the tracking data corresponds to the threatening behaviors of the at least three threat models; and
      modifying, using the computer processor, the tracking data of vessels based on the results of the elevating a risk of threat; and
   an output device configured to output the modified tracking data of vessels.

20. The system of claim 19, wherein the tracking data of vessels currently in the geographic area is collected by radar.

21. The method of claim 19, wherein said analyzing includes comparing the tracking data with said at least three overt threat models.

22. The method of claim 19, wherein the overt threat model models various maritime vessels forming a swarm.

23. The method of claim 19, wherein the overt threat model models synchronized maritime vessels.

24. The method of claim 19, wherein the modifying further comprises changing a portion of the tracking data from a first color to a second color.

25. The method of claim 19, wherein the outputting device further comprises a display configured to display the modified tracking data of vessels on a display.

26. The method of claim 25, wherein the display further displays a warning about potential threats.

27. A system for detecting threats, the system comprising: a computer-readable memory configured to store computer executable instructions; a processor configured to execute the computer executable instructions, the computer executable instructions comprising: receiving historical data regarding vessel patterns in a geographic area; generating, using a computer processor, at least one pattern of activity distribution based on the received historical data and at least two overt threat models, wherein the at least one pattern of activity distribution includes a distribution of normal traffic; receiving tracking data of vessels currently in the geographic area; analyzing, using the computer processor, the tracking data of vessels using the at least one pattern of activity distribution and at least two overt threat models to determine whether the tracking data corresponds to threatening behaviors identified by the at least one pattern of activity distribution and the at least two overt threat models; elevating a risk of threat if the tracking data corresponds to the threatening behaviors of the at least one pattern of activity distribution and the at least two overt threat models; and modifying, using the computer processor, the tracking data of vessels based on results of the elevating a risk of threat; and an output device configured to output the modified tracking data of vessels.

28. The method of claim 27, wherein the tracking data of vessels currently in the geographic area is collected by radar.

29. The method of claim 27, wherein the modifying further comprises changing a portion of the tracking data from a first color to a second color.

30. The method of claim 27, wherein the output device further comprises a display configured to display the modified tracking data of vessels on a display.

31. The method of claim 30, wherein the display further displays a warning about potential threats.

32. The method of claim 27, wherein the analyzing further comprises testing results using a Bayesian Belief Network.

33. The method of claim 27, wherein the at least one pattern of activity distribution is a speed distribution.

34. The method of claim 27, wherein the at least one pattern of activity distribution is a heading distribution.

35. The method of claim 27, wherein the at least one pattern of activity distribution is a traffic density distribution.

36. The method of claim 27, wherein the at least one pattern of activity distribution is a spacing distribution.

* * * * *